Dec. 8, 1970     S. G. RUMBOLD     3,545,203

ABLATIVE INJECTORS

Filed Oct. 29, 1968

INVENTOR.
SIDNEY G. RUMBOLD
BY D. Gordon Angus
ATTORNEY.

3,545,203
ABLATIVE INJECTORS
Sidney G. Rumbold, Claremont, Calif., assignor to Aerojet-General Corporation, El Monte, Calif., a corporation of Ohio
Filed Oct. 29, 1968, Ser. No. 771,535
Int. Cl. F02k 9/02
U.S. Cl. 60—39.74                                  10 Claims

ABSTRACT OF THE DISCLOSURE

An injector according to the present disclosure comprises an ablative body forming an injector face of the combustion chamber of a rocket engine. Injection means is supported by the body for injecting propellant into the combustion chamber.

---

This invention relates to ablative injectors, and particularly to injectors having an ablative injection face.

Injectors for rocket engines and the like have injector faces which form one end of the combustion chamber of the rocket engine. Heretofore, injectors have been subjected to failure due to thermal destruction of the injector face. Thermal destruction is most likely to occur when one or more of the following conditions exist: (1) when the combustion pressure in the rocket chamber is relatively low (so that the pressure differential across the rocket engine nozzle is relatively low, thereby limiting discharge of hot exhaust gases); (2) when the local heat transfer rates are relatively high at the injector face; and (3) when the injector face is insufficiently cooled.

Heretofore, injectors have been cooled by means of a cooling system so as to dissipate heat at the injector face. Cooling systems for injectors have not been completely effective because any failure of the cooling system or improper regulation of coolant flow can cause a reduction of coolant flow to the injector face resulting in a buildup of destructive thermal conditions or "hot spots" in localized areas on the injector face. Furthermore, the difficulty in regulating the coolant flow to the injector face has often made cooling systems costly as well as bulky.

The present invention eliminates the major problems associated with injector cooling systems by providing an uncooled injector constructed of an ablative material.

It is an object of the present invention to provide an ablative injector which requires no cooling system.

Another object of the present invention is to provide an uncooled injector for a rocket engine.

Another object of the present invention is to provide an ablative injector for a rocket engine.

A rocket engine injector according to the present invention is constructed of ablative material, and requires no cooling system. The ablative material permits local thermal erosion to occur, but by its nature restricts the erosion to a nondestructive condition.

According to one feature of the present invention, propellant is injected through inserts mounted in an ablative injector body.

Figure 1:
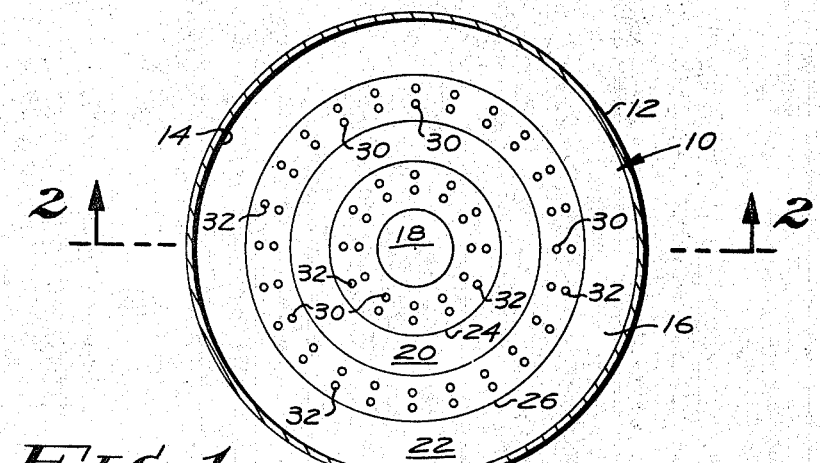
Figure 2:
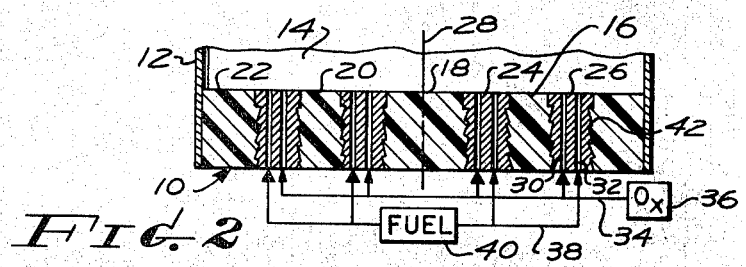
Figure 3:
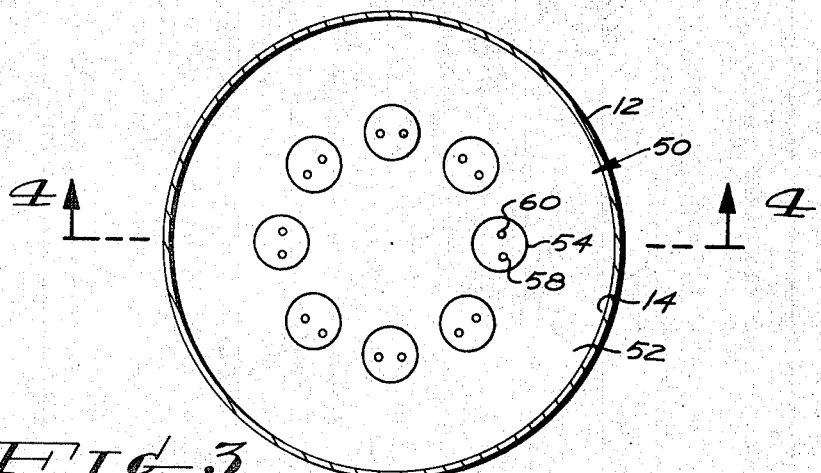
Figures 4, 5:
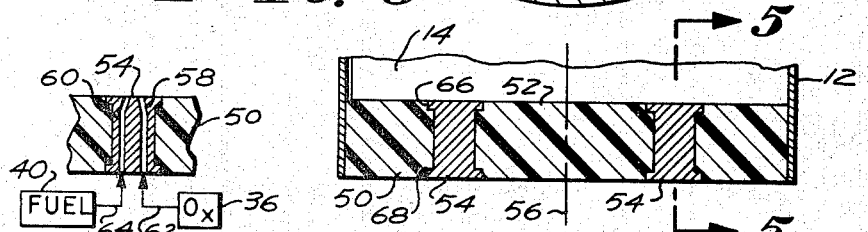

The above and other features of this invention will be more fully understood from the following detailed description and the accompanying drawings, in which:

FIG. 1 is a top view elevation of an injector according to the presently preferred embodiment of the present invention;

FIG. 2 is a section view along line 2—2 in FIG. 1;
FIG. 3 is a top view elevation of an injector according to a modification of the present invention;
FIG. 4 is a section view taken along line 4—4 in FIG. 3; and
FIG. 5 is a section view taken along line 5—5 in FIG. 4.

Referring now to the drawings and particularly FIGS. 1 and 2, there is illustrated an injector 10 mounted to cylinder 12 which forms combustion chamber 14 of a rocket engine. Injector 10 forms an injector surface 16 within rocket chamber 14.

Injector 10 is constructed of a suitable ablative material such as quartz and phenolic reisn. As illustrated particularly in FIGS. 1 and 2, injector 10 comprises a disc-shaped body 18, a first ring-shaped body 20, and a second ring-shaped body 22. Between bodies 18 and 20 is injection ring 24, and between bodies 20 and 22 is injection ring 26. Each member 18, 20, 22, 24 and 26 is centered on axis 28 of the rocket engine.

Each of the injection rings 24 and 26 includes a plurality of first apertures or ports 30 and a plurality of second apertures or ports 32. Ports 30 and 32 are preferably arranged in pairs, and each of ports 30 is connected by means of a manifold, diagrammatically illustrated at 34, to a supply 36 of oxidizer, and each of the ports 32 is connected by means of a manifold, diagrammatically illustrated at 36, to supply 40 of fuel.

Each injection ring 24 and 26 includes a portion 42 which engages the ring surface of the adjoining ablative member. The entire injector is mounted to the wall 12 of the rocket engine by means (not shown) to close the end of combustion chamber 14 and to form injection face 16.

FIGS. 3 to 5 illustrate a modification of an ablative injector according to the present invention wherein a single body 50 of ablative material forms face 52 of the injector. Body 50 is connected by means (not shown) to wall 12 to close the end of combustion chamber 14. A plurality of cylindrical inserts 54 is disposed at suitable locations about axis 56 of the combustion chamber, and each includes a pair of apertures or ports 58 and 60 therethrough. One of the pairs of ports 58 is connected by means of a manifold, illustrated diagrammatically at 62, to supply 36 of oxidizer, while each port 60 is connected by means of a manifold, illustrated diagrammatically at 64, to supply 40 of fuel. Each insert 54 preferably includes annular lips 66 and 68 to hold the inserts in the ablative body 50.

In operation of the injector according to the present invention, propellant is injected through the ports into the combustion chamber of the rocket engine. Fuel and oxidizer may be injected through separate ones of the pairs of ports into the combustion chamber to be burned in the combustion chamber. The injection rings 24 and 26 illustrated in FIGS. 1 and 2 and the inserts 54 illustrated in FIGS. 3 to 5 may be constructed of any suitable material, such as aluminum or stainless steel. The flowing propellant through the ports of the stainless steel or aluminum material maintains the inserts and injection rings sufficiently cool during the burning of propellant in combustion chamber 14. In the areas of the injection face which are not cooled by propellant flowing through the injection ports, the ablative material permits local thermal erosion, but restricts the erosion to a nondestructive condition. Specifically, in the case of an ablative material constructed of quartz and phenolic resins, the heat of combustion within the combustion chamber will decompose the phenolic resins to give off a cooling gas so as to maintain the surface of the ablative portion of the injection face cool. The remaining quartz and decomposed resin build an insulating face on the ablative injection face to reduce further thermal erosion.

Although in a sufficient amount of time the ablative material will eventually be burned away by the combustion gases, the thickness of the ablative material may be regulated so as to sufficiently outlast the amount of propellant burned in the combustion chamber. Thus, controlled local erosion will keep the injector cool without destroying the injector itself.

The present invention thus provides an ablative injector for a rocket engine capable of ablatively cooling the injector face. An ablative injector according to the present invention is easily manufactured, and the inserts or injection rings containing the injection ports may be cast with the ablative material in a single operation, thereby eliminating the complex machining of cooling passages heretofore required in prior injectors. Furthermore, the inserts and injection rings may be tested in micro motors for use in larger scale motors. The use of a plurality of inserts permits flexibility of the design of the injector face for optimum performance of the injector and rocket engine.

This invention is not to be limited by the embodiments shown in the drawings and described in the description, which are given by way of example and not of limitation, but only in accordance with the scope of the appended claims.

What is claimed:

1. An injector for a rocket engine or the like comprising: an ablative body forming an injection face of a combustion chamber; and injection means supported by said ablative body for injecting propellant into said combustion chamber.

2. An injector according to claim 1 wherein said injection means comprises an injector body supported by said ablative body, port means through said injector body for injecting propellant into said combustion chamber, one of said bodies comprising a substantially disc-shaped member and a first substantially ring-shaped member, the other of said bodies comprising a second substantially ring-shaped member, support means on said injector body for mounting said second ring-shaped member to said disc-shaped member and to said first ring-shaped member, said disc-shaped member and said ring-shaped members together forming said injector face.

3. An injector according to claim 2 wherein said port means comprises a plurality of groups of ports, means connecting at least one port of each group to a source of fuel, and means connecting at least another port of each group to a source of oxidizer.

4. An injector according to claim 2 wherein said support means comprises a serrated portion on the sides of said injector body, each serrated portion being adapted to engage a portion of said ablative body.

5. An injector according to claim 2 wherein said one body further includes a third substantially ring-shaped member and said other body further includes a fourth substantially ring-shaped member, said support means further mounting said third ring-shaped member to said second ring-shaped member and to said fourth ring-shaped member.

6. An injector according to claim 5 wherein said port means comprises a plurality of groups of ports, means connecting at least one port of each group to a source of fuel, and means connecting at least another port of each group to a source of oxidizer.

7. An injector according to claim 5 wherein said support means comprises a serrated portion on the sides of said injector body, each serrated portion being adapted to engage a portion of said ablative body.

8. An injector according to claim 1 wherein said injection means comprises a plurality of inserts each having port means disposed therethrough for injecting propellant, each of said inserts being mounted in an aperture in said ablative body.

9. An injector according to claim 8 wherein said port means comprises a plurality of groups of ports, means connecting at least one port of each group to a source of fuel, and means connecting at least another port of each group to a source of oxidizer.

10. An injector according to claim 1 wherein said injection means includes a plurality of groups of ports, means connecting at least one of each group of ports to a supply of fuel, and means connecting at least another of each group of ports to a supply of oxidizer.

References Cited

UNITED STATES PATENTS

| | | | |
|---|---|---|---|
| 3,285,013 | 11/1966 | Bell | 60—258 |
| 3,354,651 | 11/1967 | Novotny | 60—258 |

MARK M. NEWMAN, Primary Examiner

D. HART, Assistant Examiner

U.S. Cl. X.R.

60—258